United States Patent [19]
Sato

[11] Patent Number: 5,376,178
[45] Date of Patent: Dec. 27, 1994

[54] COATING APPARATUS

[75] Inventor: Shogo Sato, Miyagi, Japan

[73] Assignee: Sony Corporation, Tokyo, Japan

[21] Appl. No.: 917,233

[22] Filed: Jul. 23, 1992

[30] Foreign Application Priority Data

Jul. 31, 1991 [JP] Japan .................. 3-214586
Jul. 31, 1991 [JP] Japan .................. 3-214589

[51] Int. Cl.$^5$ .................. B05C 3/02; B05C 3/132
[52] U.S. Cl. .................. 118/411; 118/410; 118/419
[58] Field of Search .............. 118/325, 410, 411, 419, 118/412; 427/131, 356, 430.1; 425/381.2, 382 R, DIG. 16, DIG. 29

[56] References Cited

U.S. PATENT DOCUMENTS

| | | | |
|---|---|---|---|
| 2,941,898 | 6/1960 | Wynn | 118/419 |
| 4,424,762 | 1/1984 | Tanaka et al. | 118/410 |
| 4,480,583 | 11/1984 | Tanaka et al. | 118/410 |
| 4,487,563 | 10/1984 | Lhommeau et al. | 425/382 R |
| 4,537,801 | 8/1985 | Takeda | 427/356 |
| 4,681,062 | 7/1987 | Shibata et al. | 119/410 |
| 4,854,262 | 8/1989 | Chino et al. | 427/356 |
| 4,994,306 | 2/1991 | Takahashi et al. | 427/131 |
| 5,028,450 | 7/1991 | Naka et al. | 427/430.1 |
| 5,042,422 | 8/1991 | Tobisawa et al. | 118/410 |
| 5,069,934 | 12/1991 | Chino et al. | 427/131 |
| 5,083,524 | 1/1992 | Hiraki et al. | 118/419 |
| 5,097,792 | 3/1992 | Umemura et al. | 118/325 |
| 5,167,713 | 12/1992 | Watanabe | 118/411 |
| 5,173,119 | 12/1992 | Watanabe et al. | 118/419 |
| 5,275,660 | 1/1994 | Ozaki et al. | 118/419 |
| 5,302,206 | 4/1994 | Shibata et al. | 118/419 |

FOREIGN PATENT DOCUMENTS

| | | | |
|---|---|---|---|
| 0388818 | 9/1990 | European Pat. Off. | 118/411 |
| 0392810 | 10/1990 | European Pat. Off. | 118/419 |
| 2-35959 | 2/1990 | Japan | 118/419 |

OTHER PUBLICATIONS

Patents Abstracts of Japan, of JP-2-35959 (Pub. Feb. 6, 1990), vol. 1,. No. 192, (C711) 4135, Apr. 19, 1990.

Primary Examiner—Joseph W. Drodge
Attorney, Agent, or Firm—Hill, Steadman & Simpson

[57] ABSTRACT

A coating apparatus for applying a coating on a flexible support which is continuously moving across a die characterized by the die having at least one lip portion with an extrusion slit separating the lip portion into a front blade surface followed by a smoothing blade surface. The improvements are that the smoothing blade surface has a pocket adjacent the slit and an upstream side of the smoothing blade surface lies on a tangent taken at a downstream edge of the front blade surface. The pocket may be formed by a planar surface which separates the slit from a curved surface of the smoothing blade surface or can be formed by the shape of a curved surface of the smoothing blade surface which has the leading or upstream edge disposed inward of the downstream side or edge of the front blade surface. If more than one layer is to be provided, the die has two lip portions which are substantially identical, which portions are spaced apart by a gap so that the first coating can be spaced from the die for a short period of time.

7 Claims, 6 Drawing Sheets

COATING APPARATUS

BACKGROUND OF THE INVENTION

1. Field of the Invention

This invention relates to a coating apparatus of the extrusion type called a die coater.

2. Description of the Prior Art

Hitherto, as a method of applying a magnetic coating composition in manufacturing a magnetic recording medium of the coating type, the roll coating system using a roll as represented by the gravure roll system or the reverse roll system, etc. has been a main current.

However, in such a roll coating system, there are the problems of a change in the output due to unevenness of the coating thickness by an unsatisfactory coating transfer from the roll to the base film, drop out by the coating splash, and degradation in the coating quality as the result of the fact that the excess or surplus supplied coating liquid or solution is returned to the mixing process. Particularly, as the coating speed become high, such problems have a tendency to become remarkable.

In recent years, as a new coating system capable of solving these problems, attention has been drawn to the extrusion (die) system. In the process for manufacturing coating type magnetic recording media, such an extrusion system has been already put to practice in part.

The extrusion system uses a die which has a narrow slit of a predetermined width at the front end portion thereof and includes a doctor edged surface in the vicinity of the front end portion of the die, to coat a coating liquid, onto a moving support, and the coating liquid is continuously extruded toward the surface of the moving support and is spread by the doctor edged surface with a uniform thickness. Such an extrusion system has been used until now in the photographic field such as for photographic film or photographic (printing) paper, etc.

Further, if an attempt is made to manufacture a so called magnetic recording medium of the double layer type by using, e.g., the roll coating system, the same process step is required to be repeated twice. As a result, the process becomes complicated, giving rise to inconveniences such that the manufacturing cost is increased. In addition, with the above-mentioned roll coating system, it is difficult to carry out a thin coating such that the thickness of the upper layer is less than 1 $\mu$m. For this reason, it is the present circumstances that this roll coating system is hardly applied in the manufacturing of a video tape, etc.

Meanwhile, in the coating apparatus of the extrusion system, it is known that the shape of the front edge surface of the die in contact with the flexible support has a great influence on the coating film quality, and improvements thereof have been developed in various fields until now.

For example, in U.S. Pat. No. 4,424,762, U.S. Pat. No. 4,480,583, U.S. Pat. No, 4,681,062, U.S. Pat. No. 5,042,422, and the Japanese Patent Application Laid Open No. 35959/1990, etc., there are disclosed coating apparatuses in which the shape of the die edge portion (so called a lip portion) is prescribed in various manners.

However, even with these technologies, it is impossible to sufficiently suppress an occurrence of coating unevenness or streak-like irregularity, etc. For this reason, further improvement is expected.

Further, as the technology for carrying out double layer coating in the above-mentioned coating apparatuses of the extrusion system, the following technologies are generally enumerated.

A first method is a method as disclosed in the Japanese Patent Application Laid Open No. 261562/1990 or the Japanese Patent Application Laid Open No. 268,862/1990, in which different coating liquids are simultaneously fed from two pockets provided in the die into a single slit. A second method is a method as disclosed in the U.S. Pat. No. 4,854,262 or the Japanese Patent Application Laid Open No. 251265/1990, in which two slits are provided in the die to extrude coating liquid from these two slits onto a support continuously running in sequence along the front edge surface, the center edge surface, and the back edge surface. A third method is a method as disclosed in the Japanese Patent Application Laid Open No. 153/1991 publication, etc., in which two dies formed entirely in separate bodies are used to separately apply coating onto respective layers.

However, even in the case where any methods described above are employed, it is difficult to carry out double layer simultaneous coating having less unevenness of the coating thickness. For example, in the case of the first technology, two kinds of coating liquids flow in a manner of two-liquid laminar flow into a single slit. As a result, the smooth boundary surface between coated films of the two layers obtained as the result of the fact that two kinds of coating liquids are mixed at the boundary is difficult to obtain. Thus, there occurs unevenness in the coating thickness in both layers. Also, in the case of the second technology, since a coating layer coated by the first slit shifts to the next slit in the liquid state in contact with the center edge surface, the next layer is coated on the first layer as it remains in the liquid state. As a result, similarly to the previously mentioned first technology, two kinds of coating liquids are mixed at the boundary thereof, so there occurs unevenness of the coating thickness in the both layers. In addition, in the case of the third technology, the distance from coating of the lower layer up to coating of the upper layer is increased. As a result, the balance of solvent with the upper layer is lost resulting from drying of the lower layer so that the subsequent coating is difficult to carry out. Thus, there also occurs unevenness in the coating thickness.

SUMMARY OF THE INVENTION

With the above in view, an object of this invention is to provide a coating apparatus in which a stable coating state can be obtained, and a high quality coating film having a uniform coating thickness and a smooth surface free from streak-like irregularity, etc. can be formed.

Another object of this invention is to provide a coating apparatus in which a smooth boundary surface can be formed between respective layers and unevenness of the coating thickness of respective layers can be a minimum.

A further object of this invention is to provide a coating apparatus in which even when applied to separate coating of respective layers, coating distance therebetween can be shorten, and a coating film of a high quality can be obtained without degrading the coating property of the upper layer of the coating.

A coating apparatus of this invention is directed to a coating apparatus of the extrusion type adapted for applying coating onto a flexible support continuously running along a front blade surface and a smoothing blade surface of the die edge portion while extruding a coating composition by a lip portion or portions provided at the die edge portion, characterized in that the front edge portion of the smoothing blade surface is positioned on a tangential line at the edge portion on the downstream side of the front blade surface.

Further, a plurality of lip portions are integrally provided at the die, and a gap portion for allowing the coated layer on the flexible support to be spaced from the die is provided between respective lip portions.

It is to be noted that the die front edge portion (lip portion) positioned on the upstream side (incoming or advancing side of the flexible support) relative to the flexible support continuously running is called a front blade, and the lip portion positioned on the downstream side relative to that flexible support is called a smoothing blade.

At the lip portion of the die, when the front blade is projected in a forward direction (in a coating composition extrusion direction) with respect to the smoothing blade, an excessive contact pressure is applied to the support at the edge portion on the downstream side of the front blade so that the support is bent. As a result, defects or flaws, or shavings, etc. occur.

In contrast, when the smoothing blade is projected with respect to the front blade, the gap between the smoothing blade and the support becomes too large at the edge portion on the downstream side of the front blade. As a result, streak-like irregularity by involvement of air or air pressure takes place. Further, when the front blade surface is excessively withdrawn, the coating liquid pressurized by the smoothing blade surface and the support surface overflows on the front blade side. Thus, coating becomes impossible.

In this invention, the front edge of the smoothing blade surface is positioned on a tangential line at the edge portion on the downstream side of the front blade surface. Thus, the problem of defects or flaws, or shavings of the support occurring as the result of the fact that the front blade is projected is solved, and the problem of streak-like irregularity or overflow occurring as the result of the fact that the smoothing blade is projected is also solved.

Further, in the coating apparatus of this invention, the lower layer coating film coated on the first lip portion is subjected to figuring, and it is thus spaced from the die at the gap portion provided in the die. Accordingly, the boundary surface between layers is smoothed.

In addition, at this time, since respective lip portions are integrally provided in the unitary die, the distance between lip portions can be small. Thus, losing of the balance of a solvent with the upper layer resulting from drying of the lower layer is solved.

In accordance with this invention, it is possible to provide a coating apparatus in which a stable coating state can be obtained, and a high quality coated film having a uniform coating thickness and a smooth surface free from streaks, etc. can be formed.

In addition, when applied to a multiple or multi-layer coating, there can be provided a multiple coating apparatus in which the boundary surface between layers is smooth, there is no unevenness of the coating thickness, and there is no possibility that the coating quality of the upper layer is degraded.

DESCRIPTION OF THE PREFERRED EMBODIMENTS

Preferred embodiments to which this invention is applied will now be described with reference to the attached drawings.

EMBODIMENT 1

Figure 1:
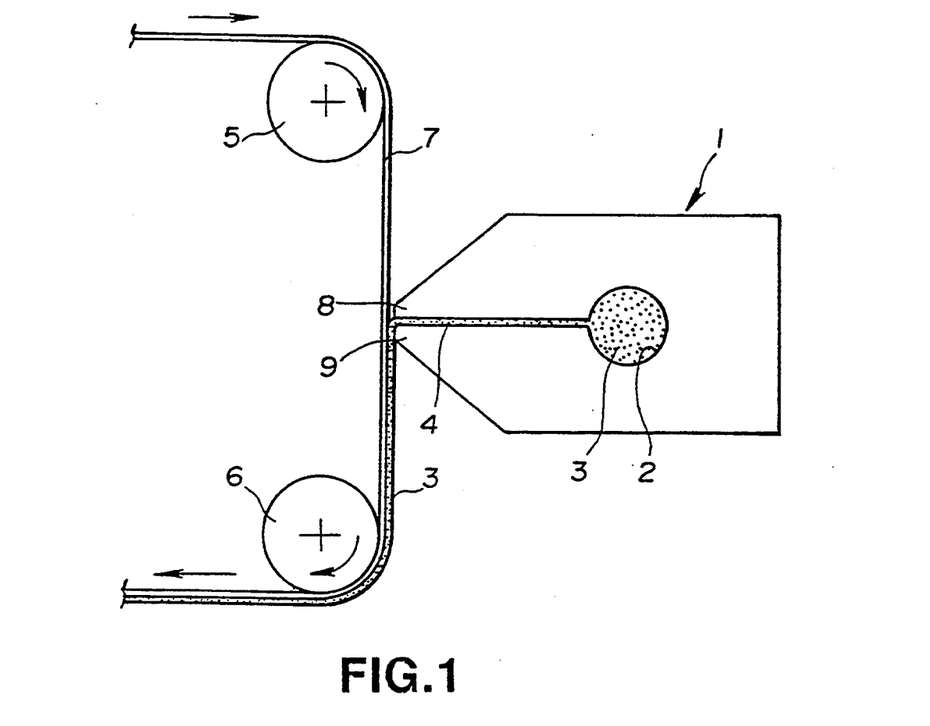
FIG. 1 is a cross sectional view showing an example of the outline of the configuration of a coating apparatus to which this invention is applied.

A coating apparatus of this embodiment is used for applying a magnetic coating composition in the process of manufacturing a magnetic recording medium of the coating type. As shown in FIG. 1, a magnetic coating composition 3 in a liquid state (hereinafter referred to as a coating liquid 3) is supplied into a pocket (coating liquid reservoir) 2 of a die (extruder) 1. The magnetic coating liquid thus supplied is further delivered into a slit 4, and is extruded therefrom. The magnetic coating liquid thus extruded is coated onto a base film 7 caused to run through guide rolls 5, 6, etc.

Figure 2:
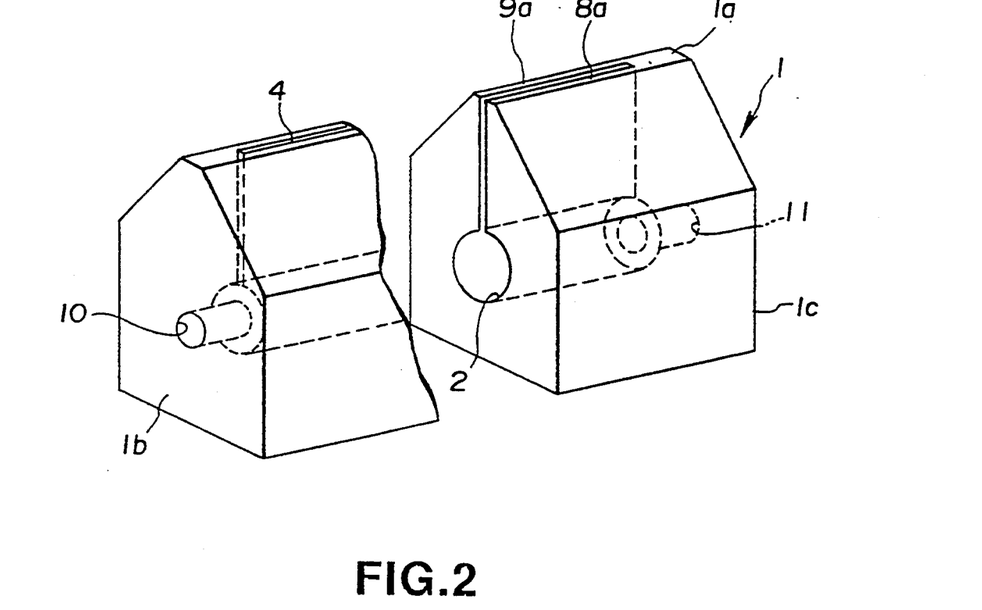
FIG. 2 is a schematic perspective view showing a die in a manner broken in part.

The above-mentioned die 1 is comprised, as shown in FIG. 2, of a metal block in the form of substantially rectangular parallelopiped having a predetermined width. More particularly, the front end portion of this die 1 is obliquely shaved so as to take so called a wedge shape, and a front blade 8 and a smoothing blade 9 formed by cemented carbide, etc. are integrally provided at the front end portion 1a.

Further, in the die 1, slit 4 is formed in correspondence with a coating width so as to face the front end surface 1a of the die 1. This slit 4 serves as a gap through which coating liquid is extruded, and is ordinarily formed as a very narrow gap of about 0.01 to 2 mm.

Further, on the rear side of the slit 4, pocket 2 communicating with the slit 4 is formed as a columnar space having a length substantially equal to the width of the slit 4. In addition, coating liquid supply ports 10, 11 having an inside diameter smaller than the inside diameter of the pocket 2 are provided at the both end portions of the pocket 2 so that they are opened toward the both side surface 1b, 1c of the die 1. The magnetic coating liquid 3 is adapted to be supplied into the pocket 2 from these coating liquid supply ports. Accordingly, the pocket 2 serves as a space adapted to receive coating liquid force-fed from a coating solution supply unit and it thus has a function of the accumulator.

In the coating apparatus thus constructed, magnetic coating liquid 3 supplied from a precision coating liquid supply unit into the pocket 2 of the die 1 is uniformly extruded into the slit 4 with its coating pressure being caused to be uniform by the accumulator effect. The base film 7 is continuously running in the state embraced along the front blade 8 and the smoothing blade 9 provided at the exist end portion of the slit 4. The magnetic coating liquid 3 extruded from the slit 4 is formed into a coating film having a uniform coating thickness and a smooth surface by the smoothing blade 9.

The outline of the configuration of the coating apparatus of this embodiment has been described as above. In such a coating apparatus, the shapes of the front end surface (front blade surface) 8a of the front blade 8 and the front surface (smoothing blade surface) 9a of the smoothing blade 9 have a great influence on the quality of coating film thus formed.

Figure 3:
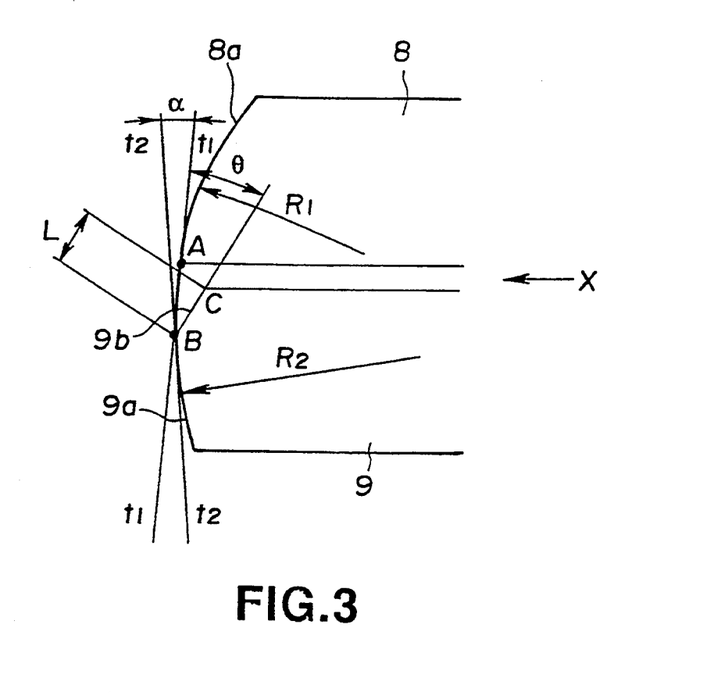
FIG. 3 is a model view showing the shape of a front blade and a smoothing blade in an embodiment to which this invention is applied.

The shapes of the front blade surface 8a and the smoothing blade surface 9 will now be described in detail with reference to FIG. 3, First, the smoothing blade surface 9a is required for obtaining a smooth flow of the coating liquid to take a form of a curved surface. Further, it is preferable that, when attention is drawn to running ability, etc. of the base film 7, the front blade surface 8a also takes a form of a curved surface.

In view of this, the smoothing blade surface 9a was caused to be a curved surface having a radius of curvature $R_2$ of 60 mm, and the front blade surface 8a was caused to be a curved surface having a radius of curvature $R_1$ of 10 mm or 60 mm.

Further, in order to coat the base film 7 by the coating liquid on the smoothing blade surface 9a, it is required to allow a space between the edge portion on the upstream side of the smoothing blade surface 9a and the base film 7 to be wedge-shaped so that a higher pressure is provided. For this reason, a planar portion 9b having a suitable angle relative to the base film 7 is provided at the edge portion on the upstream side of the smoothing blade 9.

In this embodiment, the length of the planar portion 9b is set so as to satisfy the relationship expressed as 1 mm $< L \leq 1.5$ mm. This is because when the length of the planar portion 9b is short, i.e., L is less than 1 mm, the coating pressure in a space encompassed by the planar portion 9b and the base film 7 rapidly rises so that the coating state becomes unstable, and when that length is too long in such a manner that it is above 1.5 mm oppositely to the above, the meaning of the provision of the planar portion 9b is lessened. It is desirable that the coating pressure gradually rises in the space encompassed by the planar portion 9b and the base film 7. From such a point of view, the above-mentioned range has been determined.

In the front blade surface 8a and the smoothing blade surface 9a described above, the front edge portion in an extrusion direction (in a direction indicated by an arrow X in FIG. 3) of the coating material from the slit 4 corresponds to the edge portion on the downstream side (point A) on the front blade surface 8a, and corresponds to the terminating portion (point B) of the planar portion 9b on the smoothing blade surface 9a.

In this embodiment, a setting is made such that when a tangential line $t_1$ is drawn at the front portion (point A in the figure) of the front blade surface 8a, the front edge portion (point B in the figure) of the smoothing blade surface 9a is positioned on the extended line of the tangential line $t_1$. It is to be noted that while it is ideal that the point B is completely in correspondence with a point on the tangential line $t_1$, slight deviation due to the processing accuracy, etc. may be allowed.

When the point B is located at a position withdrawn relative to the tangential line $t_1$, i.e., the front blade surface 8a is projected in a forward direction (in a coating material extrusion direction) relative to the smoothing blade surface 9a, there is the possibility that an excessive contact pressure may be applied to the base film 7 at the edge portion on the downstream side (point A) of the front blade surface 8a so that the base film 7 is bent, giving rise to defects or flaws, or shavings, etc.

In contrast, when the position B is located at a position advanced relative to the tangential line $t_1$, i.e., the smoothing blade surface 9a is projected from the front blade surface 8a, the gap between the smoothing blade surface 9a and the base film 7 becomes too large at the edge portion on the downstream side of the front blade surface 8a, so streak-like irregularity resulting from involvement of air or air pressure takes place. Further, when the front blade surface 8a is too withdrawn, the coating liquid 3 pressurized by the smoothing blade surface 9a and the base film 7 overflows on the front blade surface 8a so that coating is unable to be conducted.

Further, it is preferable that an angle $\alpha$ that is formed on the tangential line $t_1$ at the above-described point A and a tangential line $t_2$ drawn to the smoothing blade surface 9 at the point B, satisfies the relationship expressed as $0° \leq \alpha \leq 15°$. This is because when the above-mentioned angle $\alpha$ is too large, the base film 7 is intensely bent at the point B so that an excessive pressure elevation is produced, and dust on the base film 7, or coagulation or foreign material, etc. in the coating material is apt to be caught, so stable coating cannot be carried out. Further, allowing the entrance angle of the base film 7 to be small, i.e., setting the angle $\alpha$ to a value on the minus side (less than 0°) will withdraw the point A. As a result, it becomes impossible to satisfy the previously described requirement.

On the other hand, it is preferable that the angle of the planar portion 9b provided at the edge portion on the upstream side of the smoothing blade 9 is set in a direction allowing the angle to be small, and it is preferable, that is formed by the angle $\theta$ that the planar portion 9b and the tangential line $t_1$ at the point A is 1 to 45 degrees. As the result of the coating fluid analysis, a large vortex or turbulence is produced in the coating material in the vicinity of the planar portion 9b. For this reason, when the angle $\theta$ is caused to be too large, dust on the base film or coagulation or foreign material, etc. in the coating liquid is accumulated, so streaks are apt to occur.

Figure 4:
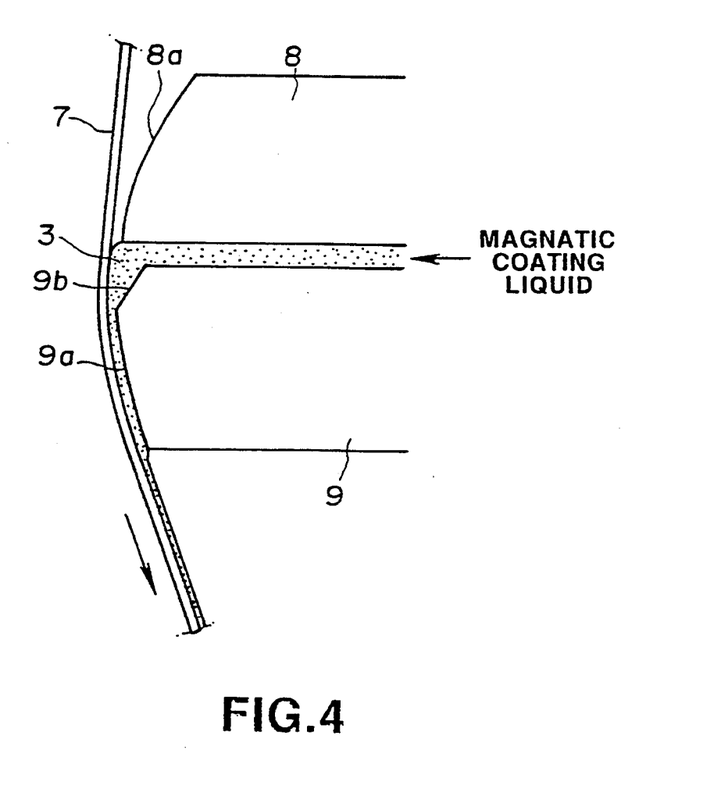
FIG. 4 is a model view showing a coating state in the embodiment to which this invention is applied.

In the die of the above-mentioned configuration, when the base film 7 comes into contact with the front blade 8 during coating, there is the possibility that defects or flaws, or shavings may occur, giving rise to serious defect. Accordingly, when the entrance angle of the base film 7 is set so as to coincide with the line connecting the points A and B at the time when coating is not yet carried out, the base film 7 is pushed or thrust up by the coating material 3 as shown in FIG. 4 at the time of coating, resulting in no possibility that the front blade 8 and the base film 7 come into contact with each other.

Then, the shape of the die front edge was changed variously to actually coat a magnetic coating liquid, thus to confirm the effect of this invention, The Configuration of a die used for an experiment is as follows.

Configuration of the Die

Die: Extrusion die having an entire width of 340 mm and a coating width of 290 mm
Pocket: A cylindrical hole having a diameter of 40 mm penetrating in a width direction of the die
Slit: Gap of 0.2 mm
Front blade: Cemented carbide having a thickness of 5 mm
Smoothing blade: Cemented carbide having a thickness of 5 mm The coating condition and the composition of the coating liquid used are as follows.

Coating Condition

Base film: Polyethylene terephtalate having a width of 305 mm and a thickness of 15 μm
Tension: 5 Kg applied to the entire width of the base film
Coating speed: 50 to 150 m/min.
Coating thickness: 3 to 6 μm after drying

| <Coating liquid composition> | |
|---|---|
| Magnetic powder (Co deposited γ - $Fe_2O_3$) | 100 parts by weight |
| Vinyl chloride system binder | 10 parts by weight |
| Polyurethane system binder | 10 parts by weight |
| Alumina | 3 parts by weight |
| Carbon | 2 parts by weight |
| Myristic acid | 1 part by weight |
| n butyl sterate | 1 part by weight |
| Methyl ethyl ketone | 100 parts by weight |
| Toluene | 60 parts by weight |
| Cyclohexane | 60 parts by weight |

In Table 1, there are shown phenomena at the time of coating in connection with the case where the front edge portion B of the smoothing blade surface 9a is in correspondence with the tangential line $t_1$, the case where the front edge portion B is projected from the tangential line $t_1$, and the case where the front edge portion B is withdrawn relative to the tangential line $t_1$.

TABLE 1

| SHAPE | PHENOMENON | ESTIMATION |
|---|---|---|
| POINT B IS PROJECTED FROM TANGENTIAL LINE $t_1$ | OVERFLOW OCCURS NO DEFECT IN BASE FILM | X |
| POINT B IS IN CORRESPONDENCE WITH TANGENTIAL LINE $t_1$ | NO OVERFLOW NO DEFECT IN BASE FILM | O |
| POINT B IS WITHDRAWN RELATIVE TO TANGENTIAL LINE $t_1$ | NO OVERFLOW DEFECT OCCURS IN BASE FILM | X |

As apparent from this Table, in order to eliminate both the defect of the base film and overflow, it is required to allow the front edge portion B of the smoothing blade surface 9a to be in correspondence with the tangential line $t_1$.

EMBODIMENT 2

This embodiment is directed to an embodiment where the shape of the smoothing blade surface is altered. Other apparatus components are the same as those of the above-mentioned embodiment 1. Accordingly, the same reference numerals are respectively attached to the same members and their detailed description is omitted here.

Figure 5:
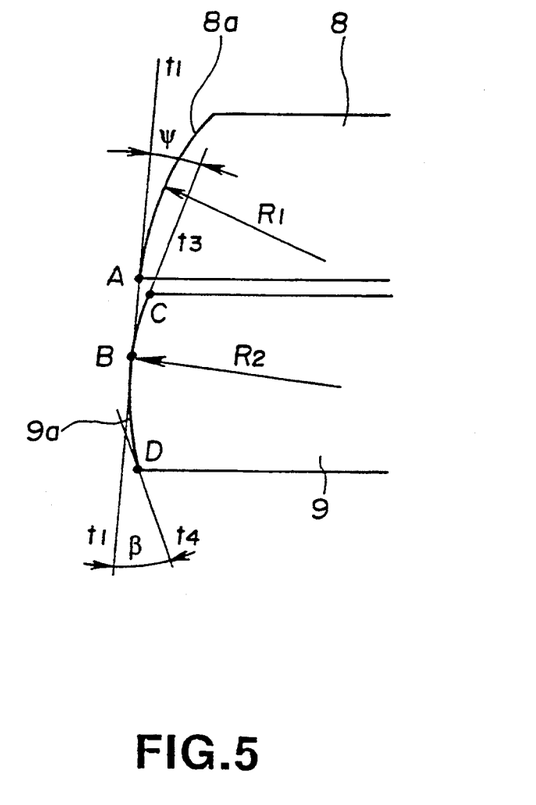
FIG. 5 is a model view showing the shape of a front blade and a smoothing blade in another embodiment to which this invention is applied.

FIG. 5 is a model view showing, in an enlarged manner, the shapes of the front blade surface 8a and the smoothing blade surface 9a in this embodiment.

Namely, in this embodiment, unlike the previously described embodiment 1, no planar portion 9b is provided at the edge portion on the upstream side of the smoothing blade 9. The smoothing blade surface 9a formed of only a continuous curved surface wherein a space between the curved surface between the point B and the point C and the base film 7 is caused to be wedge shaped so that wedge pressure is produced.

Accordingly, the point B is positioned on the tangential line $t_1$ at the point A of the edge portion on the downstream side of the front blade surface 8a, and an angle ψ, that is formed by a tangential line $t_3$ at the point C and the tangential line $t_1$, form is set to 1 to 45 degrees.

Here, the reason why the point B is positioned on the extended line of the tangential line $t_1$ is the same as that in the above-described embodiment 1. Further, the reason why the angle ψ, that is formed by the tangential line $t_3$ and the tangential line $t_1$, is limited to the above range is as follows. Namely, in order to produce wedge pressure, it is necessary that the angle ψ is 1 degree or more, and when this angle is above 45 degrees, a large vortex is produced in the wedge shaped space, so foreign materials are accumulated. As a result, streaks are apt to take place.

Further, an angle β, that is formed by a tangential line $t_4$ drawn to the smoothing blade surface 9a at the edge portion on the downstream side (point D) of the smoothing blade surface 9a and the tangential line $t_1$ at the point A Of the edge portion on the downstream side of the front blade surface 8a, is set to 0 to 45 degrees.

As described above, by allowing the smoothing blade surface 9a to be a simple curved (R-shaped) surface, smooth flow of the coating liquid can be provided, and dust on the base film 7 or, coagulation or foreign material in the coating liquid can be difficult to be caught.

Further, explanation will now be given in detail with reference to the attached drawings in connection with an embodiment 3 to which this invention is applied wherein a plurality of lip portions are integrally provided at the die, and a gap portion for allowing the coating layer on the flexible support to be spaced with the die is provided between respective lip portions.

EMBODIMENT 3

Figure 6:
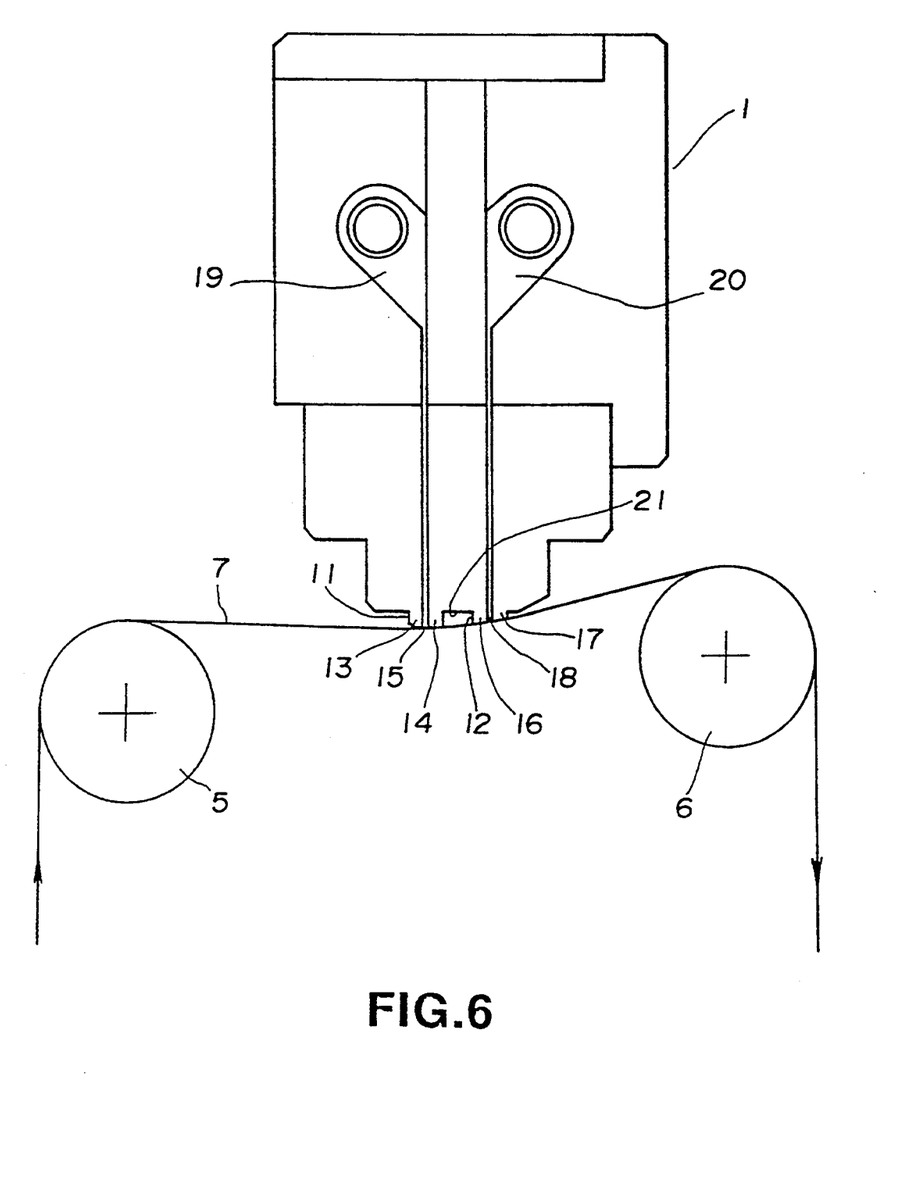
FIG. 6 is a model view showing an example of the outline of the configuration of a double layer coating apparatus to which this invention is applied.

A coating apparatus of this embodiment is used for carrying out double layer coating of the magnetic coating composition in the process for manufacturing a magnetic recording medium of the coating type. As shown in FIG. 6, a magnetic coating liquid is supplied to a die (extruder) 1 to coat the magnetic coating liquid thus obtained onto the base film 7 which runs through guide rolls 5, 6, etc.

The die 1 includes a first lip portion 11 and a second lip portion 12. The first lip portion 11 comprises a first front blade 13, a first smoothing blade 14, and a first slit 15 serving as a gap between the both blades 13 and 14, and adapted so that the coating liquid of the lower layer is extruded therefrom. Further, the second lip portion 12 comprises a second front blade 16, a second smoothing blade 17, and a second slit 18 serving as a gas between the both blades 16 and 17 and adapted so that the coating liquid of the upper layer is extruded therefrom.

It is to be noted that, at the respective lip portions 11 and 12, the upstream side (advancing side) of the base film 7 is called a front blade, and the downstream side thereof is called a smoothing blade.

Further, slits 15, 18 of respective lip portions 11, 12 serve as a gap from which the coating liquid is extruded. Ordinarily, such slits are formed as a very narrow gap of about 0.01 to 2 mm, At the rear side of the respective slits 15, 18, pockets 19, 20 communicating with the slits 15, 18 are formed as a columnar space. At these pockets 19, 20, coating liquid supply ports (not shown) are provided. From these coating liquid supply ports, the lower layer coating liquid and the upper layer coating liquid are adapted to be supplied into the pockets 19, 20, respectively. Accordingly, the respective pockets 19, 20 serve as a space which is adapted to receive the coating liquid force-delivered from the coating liquid supply unit, and has a function of the accumulator.

Further, in the region between the first and second lip portions 11 and 12, a gap portion is provided in a manner to cut the die 1. Thus, the first lip portion 11 and the second lip portion 12 are constituted independent lip portions, respectively.

In the coating apparatus thus constructed, the base film 7 is first caused to run along the front blade 13 and the smoothing blade 14 constituting the first lip portion 11, and the lower layer coating liquid extruded from the slit 15 is coated on the surface of the base film 7.

The lower layer coated film thus formed is subjected to figuring by the smoothing blade 14, and is then spaced from the die 1 at the gap portion 21.

At this time, since the gap portion 21 is not so large a space, there results the state where a solvent gas is filled therewithin. Accordingly, drying of the lower layer coated film is suppressed. Thus, a bad effect in coating the upper layer is suppressed to be as minimum as possible.

Then, the base film 7 is caused to run along the front blade 16 and the smoothing blade 17 constituting the second lip portion 12. Thus, the upper layer coating liquid extruded from the slit 18 is coated onto the surface of the lower layer of the coated film.

The outline of the configuration of the coating apparatus of this embodiment has been described as above. In such a coating apparatus, the shapes of the lip portions 11, 12, particularly the shapes of the front edge surface of the front blades 13, 16 front blade surfaces) 13a, 16a and the front edge surfaces of the smoothing blades 14, 17 (smoothing blade surfaces) 14a, 17a have a great influence on the quality of the coated film.

Figure 7:
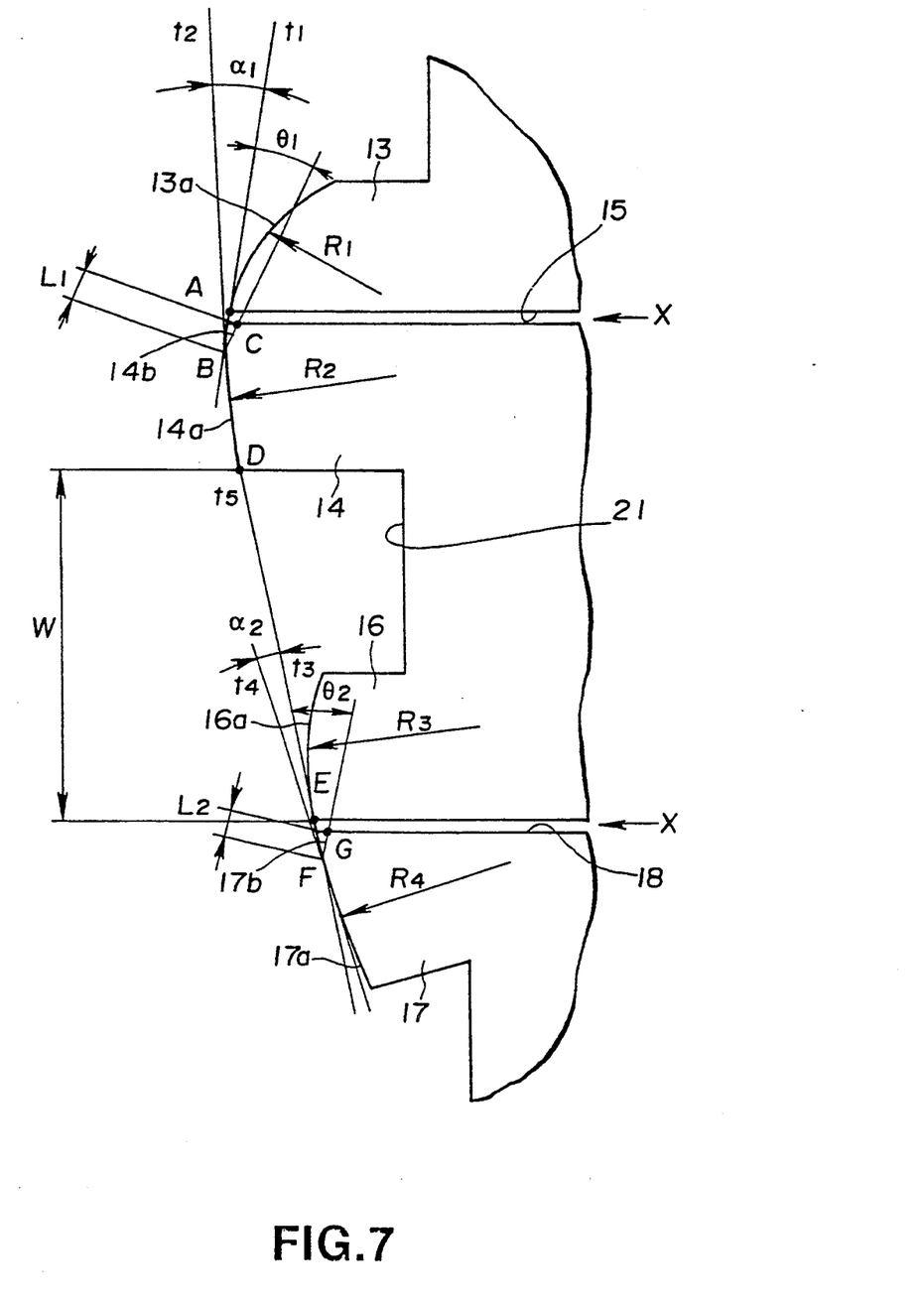
FIG. 7 is a model view showing the shape of a lip portion in an embodiment to which this invention is applied.

The shapes of the front blade surfaces 13a and 16a and the smoothing blade surfaces 14a and 17a will now be described in detail with reference to FIG. 7.

First, for obtaining a smooth flow of the coating liquid at the first lip portion 11, the smoothing blade surface 14a is required to take a form of a curved surface. Further, it is preferable that the front blade surface also takes a form of a curved surface when the running ability, etc. of the base film is taken into consideration.

In view of this, in this embodiment, the smoothing blade surface 14a was caused to be a curved surface having a radius of curvature $R_2$ of 60 mm and the front blade surface 13a was caused to be a curved surface having a radius of curvature $R_1$ of 10 mm or 60 mm.

Further, in order to coat the base film 7 by the coating composition on the smoothing blade surface 14a, it is required to allow a space between the edge portion on the upstream side of the smoothing blade surface 14a and the base film 7 to be wedge-shaped so that a higher pressure is provided. For this reason, a planar portion 14b having a suitable angle relative to the base film 7 is provided at the edge portion on the upstream side of the smoothing blade 14.

In this embodiment, the length $L_1$ of the planar portion 14b is set so as to satisfy the relationship expressed as $1\ mm < L \leq 1.5\ mm$. This is because when the length of the planar portion 14b is short, i.e., L is less than 1 mm, the coating pressure in a space encompassed by the planar portion 14b and the base film 7 rapidly rises so that the coating state becomes unstable, and when that length is too long in such a manner that it is above 1.5 mm oppositely to the above, the meaning of the provision of the planar portion 14b is lessened. It is desirable that the coating pressure gradually rises in the space encompassed by the planar portion 14b and the base film 7. From such a point of view, the above-mentioned range has been determined.

In the front blade surface 13a and the smoothing blade surface 14a described above, the front edge portion in an extrusion direction of the coating composition (in a direction indicated by an arrow X in the figure) from the slit 15 corresponds to the end portion on the downstream side (point A) on the front blade surface 13a, and corresponds to the terminating portion (point B) of the planar portion 14b on the smoothing blade surface 14a.

In this embodiment, setting the is made such that when a tangential line $t_1$ is drawn at the front end portion (point A in the figure) of the front blade surface 13a, the front end portion (point B in the figure) of the smoothing blade surface 14a is positioned on the extended line of the tangential line $t_1$. It is to be noted that while it is ideal that the point B is completely in correspondence with a point on the tangential line $t_1$, slight deviation due to the processing accuracy, etc. may be allowed.

When the point B is located at a position withdrawn from the tangential line $t_1$, i.e., the front blade surface 13a is projected in a forward direction (in a coating composition extrusion direction) relative to the smoothing blade surface 14a, there is the possibility that an excessive contact pressure is applied to the base film 7 at the end portion on the downstream side (point A) of the front blade surface 13a so that the base film 7 is bent, giving rise to defects or flaws, or shavings, etc.

In contrast, when the position B is located at a position advanced relative to the tangential line $t_1$, i.e., the smoothing blade surface 14a is projected with respect to the front blade surface 13a, the gap between the smoothing blade surface 14a and the base film 7 becomes too large at the end portion on the downstream side of the front blade surface 13a, so streak-like irregularity resulting from involvement of air or air pressure takes place. Further, when the front blade surface 13a is too withdrawn, the coating composition 3 pressurized by the smoothing blade surface 14a and the base film 7 overflows onto the front blade surface 13a so that coating is unable to be conducted.

Further, it is preferable that an angle $\alpha_1$, is formed between the above-described tangential line $t_1$ at the point A and a tangential line $t_2$ drawn to the smoothing blade surface 14a at the point B, satisfies the relationship expressed as $0° \leq \alpha_1 \leq 15°$. This is because when the above-mentioned angle $\alpha_1$ is too large, the base film 7 is intensely bent at the point B so that an excessive pressure elevation is produced, and dust on the base film 7, or coagulation or foreign material, etc. in the coating liquid is apt to be caught, so a stable coating cannot be carried out. Further, allowing the entrance angle of the base film 7 to be small, i.e., setting the angle $\alpha_1$ to a value on the minus side (less than 0°) will withdraw the point A. As a result, it becomes impossible to satisfy the previously described requirement.

On the other hand, it is preferable that the angle of the planar portion 14b provided at the front end on the upstream side of the smoothing blade 14 is set in a direction to allow the angle to be small, and it is preferable that the angle $\theta_1$, that is formed between the planar portion 14b and the tangential line $t_1$ at the point A, is set to 1 to 45 degrees. As the result of the coating fluid analysis, a large vortex is produced in the coating liquid in the vicinity of the planar portion 14b. For this reason, when the angle $\theta_1$ is caused to be too large, dust on the base film 7 or coagulation or foreign material, etc. in the coating liquid is accumulated, so streak-like irregularity is apt to occur.

At the second lip portion 12, the setting is made similarly to the above. Namely, the smoothing blade surface 17a is caused to have a radius of curvature $R_4$ of 60 mm, and the front blade surface 16a is caused to have a radius of curvature $R_3$ of 10 mm or 60 mm.

Further, setting is made such that when a tangential line $t_3$ is drawn at the front edge portion (the point E in the figure) of the front blade surface 16a, the front end portion (the point F in the figure) of the smoothing blade surface 17a is positioned on the extended line of the tangential line $t_3$, and a planar portion 17b having a suitable angle with respect to the base film 7 is provided at the front end portion on the upstream side of the smoothing blade 17.

The length $L_2$ of the planar portion 17b is set so as to satisfy the relationship expressed as $1 \text{ mm} < L_2 \leq 1.5$ mm. Further, an angle $\alpha_2$, that is formed between the tangential line $t_3$ at the point E and a tangential line $t_4$ drawn to the smoothing blade surface 17a at the point F, is set so as to satisfy the relationship expressed as $0° \leq \alpha_2 \leq 15°$. In addition, an angle $\theta_2$ that the planar portion 17b provided at the edge portion on the upstream side of the smoothing blade 17 forms with the tangential line $t_3$ at the point E is set to 1 to 45 degrees.

Then, attention is drawn to the positional relationship between the first lip portion 11 and the second lip portion 12. In this embodiment, the front edge portion (point E) of the front blade surface 16a of the second lip portion 12 is caused to be positioned on a tangential line $t_5$ at the edge portion on the downstream side (point D) of the smoothing blade surface 14a constituting the first lip portion 11. Namely, the tangential line $t_5$ at the point D of the smoothing blade surface 8a and the tangential line $t_3$ at the point E of the front blade surface 16a coincide with each other.

The distance W from the terminating portion (point D) of the first lip portion 11 up to the coating starting position (point E) at the second lip portion 12 is important from a viewpoint of the suppression of the drying of the lower layer coated film. It is desirable that the distance W is as short as possible. This is because when the surface area in contact with air of the lower layer coated film formed on the first lip portion 11 becomes large, the lower layer coated film is apt to be dried, so there is the possibility that the balance of the solvent may be lost in coating the upper layer. In view of this, the distance W is set to 5 to 100 mm in this embodiment. When the distance W is above 100 mm, drying of the lower layer coated film becomes a problem, resulting in the possibility that the quality of the upper layer coated film may be deteriorated. Further, it is difficult to provide gap portion 21 by using the existing processing technology with the distance W being caused to be less than 5 mm. It is to be noted that, in this embodiment, the space (gap portion 21) formed by the both lip portions 11, 12 and the base film 7 is constituted as a closed space except for both end portions. Accordingly, the drying of the lower layer coated film is suppressed because solvent gas can be fill such a closed space, so the bad effect on the coating of the upper layer is suppressed to be as minimum as possible.

EMBODIMENT 4

This embodiment is directed to a modification of the shape of the smoothing blade surface. Other apparatus components are the same as those of the previously described embodiment 3. Accordingly, the same reference numerals are respectively attached to the same members and their detailed explanation is omitted here.

Figure 8:
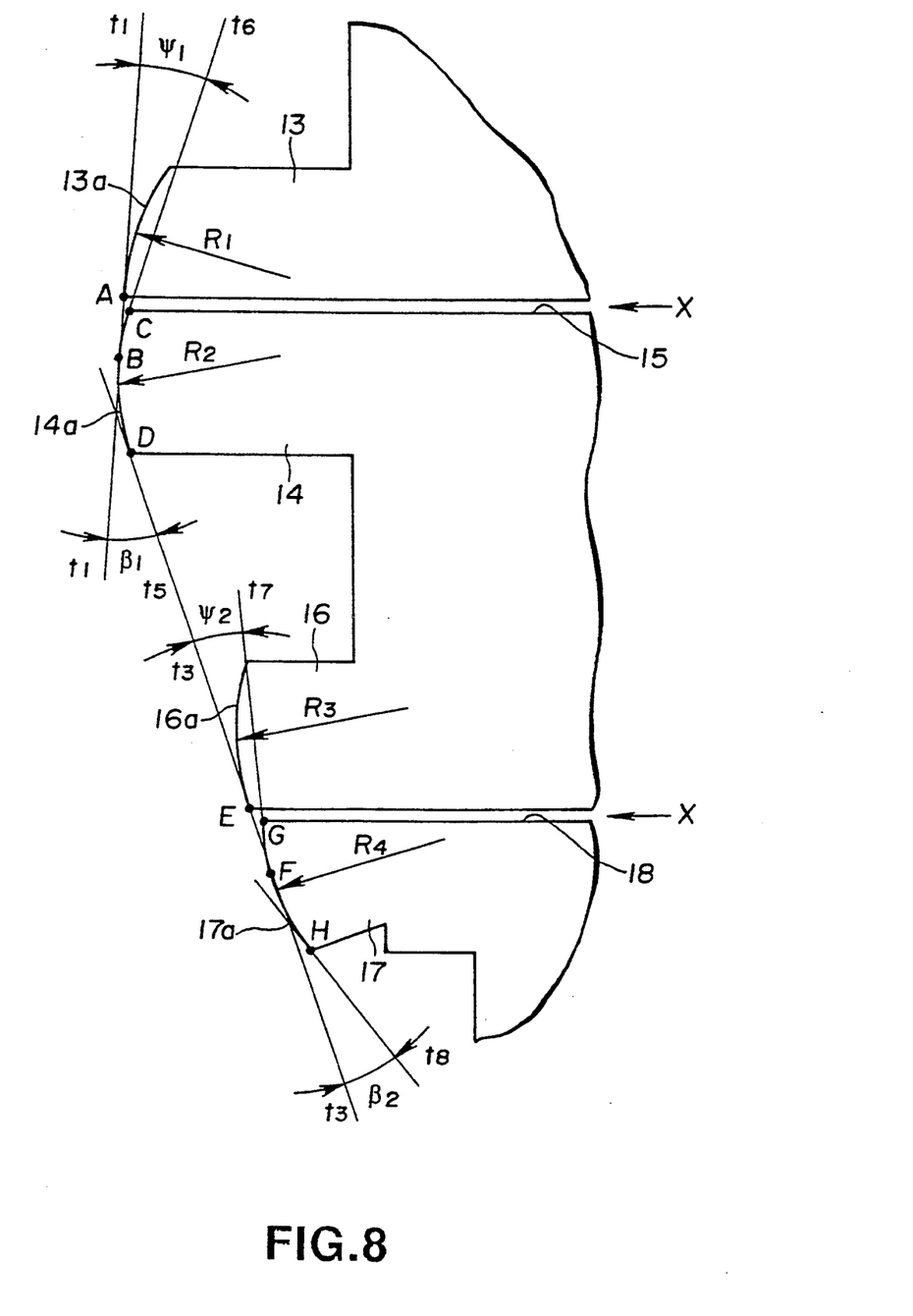
FIG. 8 is a model view showing the shape of a lip portion in another embodiment to which this invention is applied.

FIG. 8 shows, in an enlarged manner, the shapes of the front blade surfaces 13a, 16a and the smoothing blade surfaces 14a, 17a employed in this embodiment.

Namely, in this embodiment, unlike the above-described embodiment 3, planar portions 14b, 17b are not provided at the end portion on the upstream side of the smoothing blades 14, 17, but the smoothing blade surfaces 14a, 17a are comprised of only continuous curved surfaces. Thus, a space between the curved surface between the point B and the point C or the curved surface between the point F and the point G and the base film 7 is caused to be wedge-shaped so as to produce a wedge pressure.

Accordingly, the points B and F are caused to be positioned on a tangential line $t_1$ at the point A of the end portion on the downstream side of the front blade surface 13a, or on a tangential line $t_3$ at the point E of the end portion on the downstream side of the front blade surface 16a, and an angle $\psi_1$ that a tangential line $t_6$ at the point C and the above-mentioned tangential line $t_1$ form, or an angle $\psi_2$ that a tangential line $t_7$ at the point G and the above-mentioned tangential line $t_3$ form is set to 1 to 45 degrees.

The reason why the points B and F are caused to be respectively positioned on the extended lines of the tangential lines $t_1$ and $t_3$ are the same as those in the previously described embodiment 3. Further, the reason why the angle $\psi_1$ that the tangential lines $t_6$ and $t_1$ form and the angle $\psi_2$ that the tangential lines $t_7$ and $t_3$ form are limited to the above-mentioned range is as follows. Namely, an angle of 1 degree or more is required in order to produce a wedge pressure. If that angle is above 45 degrees, a large vortex is produced in the wedge shaped space so that foreign matters are accumulated. Thus, streaks are apt to occur.

Further, an angle $\beta_1$ that a tangential line $t_5$ drawn to the smoothing blade surface 14a at the end portion on the downstream side (point D) of the smoothing blade surface 14a and the tangential line $t_1$ at the point A of the end portion on the downstream side of the front blade surface 13a form, and an angle $\beta_2$ that a tangential line $t_8$ drawn to the smoothing blade surface 17a at the end portion on the downstream side (point H) of the smoothing blade surface 17a and a tangential line $t_3$ at the point E of the end portion on the downstream side of the front blade surface 16a form are set to 0 to 45 degrees.

Other settings are the same as those of the above-described embodiment 3.

As stated above, the smoothing blade surfaces 14a, 16a are cause to be a simple curved (or R-shaped) surface, thereby making it possible to provide a smooth flow of the coating liquid, and allowing dust on the base film 7 or coagulation or foreign material in the coating liquid which causes streaks to be difficult to be caught.

While explanation has been given in connection with the embodiments to which this invention is applied, it is needles to say that this invention is not limited to such embodiments and the dimension, the material and the shape, etc. may be suitably altered within the range which does not depart from the gist of this invention. Further, while the embodiments 3 and 4 are directed to the double layer coating apparatus, if the number of lips is increased, multi-layer coating of three layers or more may be carried out.

As is clear from the foregoing description, in this invention, since the front brade and the smoothing blade at the front end of the die take a reasonable form, a stable coating state free from the problems of defect of the base film and involving of air, etc. can be provided. Accordingly, in the case where this coating apparatus is used for manufacturing of, e.g., a magnetic recording medium, a coated film having less unevenness of coating thickness can be formed. Thus, it is possible to manufacture a magnetic recording medium having less output change.

Further, in this invention, a plurality of lip portions are provided at the die, a gap portion is formed between lip portions, and coating is applied onto the upper layer immediately after the lower layer surface of formed smooth. Thus, a smooth boundary surface is provided, thus permitting unevenness of the coating thickness of respectively layers to be small.

Further, in this invention, since the lip portions is integrally provided at a single die, the distance between lip portions can be small, so drying of the lower layer is held down to a minimum level. Thus, a high coating quality can be ensured without degrading coating property of the upper layer.

In addition, since the coating apparatus of this invention is such that a plurality of single layer lip portions are provided at a single die, the apparatus can be compact, and multi-layer coating can be easily carried out without necessity of individually adjusting the condition.

What is claimed is:

1. A coating apparatus constructed and arranged for extruding a coating onto a continuously moving flexible support, said apparatus including a die having a pair of lip portions spaced apart by a gap portion allowing a coating on the support to be spaced from the die, each lip portion having a front blade surface followed by a smoothing blade surface with an extrusion slit disposed therebetween with said surfaces being curved except for a planar portion extending at an angle being provided on an upstream side of said smoothing blade surface adjacent the slit to form an upstream edge therewith, the angle of said planar portion being on a tangential line with the downstream edge of the front blade surface.

2. A coating apparatus as set forth in claim 1, wherein the length L of said planar portion is set so as to satisfy the relationship expressed as $1\ mm < L \leq 1.5\ mm$.

3. A coating apparatus as set forth in claim 1, wherein an angle $\alpha$ that a tangential line at the downstream edge of said front blade surface and a tangential line at the upstream side of said smoothing blade surface form is set so as to satisfy the relationships expressed as $0° \leq \alpha \leq 15°$.

4. A coating apparatus as set forth in claim 1, wherein an angle $\theta$ that said planar portion and a tangential line at the downstream edge of said front blade surface form is set so as to satisfy the relationship expressed as $1° \leq \theta \leq 45°$.

5. A coating apparatus of the extrusion type constructed and arranged for applying a coating onto a flexible support continuously running in a first direction, said apparatus comprising a die having a first lip portion and a second lip portion spaced apart by a gap portion, each lip portion having a slit through which coating material is extruded for application on the support, each lip portion being divided by the slit into a front blade having a first curved surface and a smoothing blade surface having a second curved surface extending from a first edge formed by the slit and second curved surface to a trailing edge of the second curved surface, the second curved surface having means forming a pocket adjacent the slit with the first edge being disposed inward of a second edge being formed by the front blade surface and the slit and a line extending tangentially from a point on the second curved surface between the first edge and trailing edge being oh a tangent with the curved surface of the front blade surface at said second edge, said die being positioned relative to the flexible support so that the support moving in the first direction passes over the front blade surface, the slit and then the smoothing blade surface of the first lip portion, then the gap portion and then over the front blade surface, slit and the smoothing blade surface of the second lip portion.

6. A coating apparatus according to claim 5, wherein a tangential line taken at the first edge forms an angle $\psi$ with the first-mentioned tangential line with the relationship of $1° \leq \psi \leq 45°$.

7. A coating apparatus according to claim 5, wherein a tangential line taken at a trailing edge of each smoothing blade surface forms and angle $\beta$ with the first-mentioned tangential line with the relationship $0° \leq \beta \leq 45°$.

* * * * *